United States Patent
Mussari et al.

(10) Patent No.: US 7,407,642 B2
(45) Date of Patent: Aug. 5, 2008

(54) CHLORINE DIOXIDE GENERATION METHOD

(75) Inventors: Frederick P. Mussari, Melbourne, FL (US); David Francis, S. Jacksonville, FL (US); Wilfried Schmitz, Fruit Cove, FL (US)

(73) Assignee: Bio-Chem Resources, St. Augustine, FL (US)

( * ) Notice: Subject to any disclaimer, the term of this patent is extended or adjusted under 35 U.S.C. 154(b) by 0 days.

(21) Appl. No.: 11/372,464

(22) Filed: Mar. 10, 2006

(65) Prior Publication Data

US 2007/0212292 A1    Sep. 13, 2007

(51) Int. Cl.
*C01B 11/02* (2006.01)
(52) U.S. Cl. ........................... 423/477; 210/754
(58) Field of Classification Search .............. 423/477; 210/753, 754
See application file for complete search history.

(56) References Cited

U.S. PATENT DOCUMENTS

| | | | |
|---|---|---|---|
| 4,234,446 A * | 11/1980 | Ramras | 252/187.21 |
| 5,622,725 A * | 4/1997 | Kross | 424/665 |
| 5,855,861 A * | 1/1999 | Lee | 423/477 |
| 6,322,768 B1 * | 11/2001 | Graff et al. | 423/477 |
| 6,790,427 B2 | 9/2004 | Charles et al. | |
| 2001/0012504 A1* | 8/2001 | Thangaraj et al. | 423/477 |
| 2005/0079122 A1* | 4/2005 | DiMascio | 423/477 |
| 2005/0224750 A1* | 10/2005 | Yang et al. | 252/186.1 |
| 2007/0036871 A1* | 2/2007 | Westerman et al. | 424/661 |

* cited by examiner

*Primary Examiner*—Ngoc-Yen M Nguyen
(74) *Attorney, Agent, or Firm*—Morrison & Foerster LLP

(57) ABSTRACT

A method generating chlorine dioxide is provided. The method uses sodium chlorite solution and diluted sulfuric acid to generate chlorine dioxide with a significantly higher rate of conversion of chlorite to chorine dioxide than has been previously reported with sulfuric acid/chlorite chlorine dioxide generation.

19 Claims, No Drawings

CHLORINE DIOXIDE GENERATION METHOD

BACKGROUND OF THE INVENTION

1. Field of the Invention

The present invention relates to the generation of chlorine dioxide and more particularly relates to an improved method of chlorine dioxide generation wherein the resultant conversion of chlorite to chlorine dioxide is of an efficiency previously unknown using a two chemical system employing sulfuric acid/sodium chlorite, and in which the precursors can be retained in the reactor for a prolonged time before dilution without loss of chlorine dioxide by reaction with water to form chlorate, as has been reported when hydrochloric acid is used as the proton donor.

2. General Background

Chlorine dioxide is a powerful oxidant and disinfectant. Applications for chlorine dioxide cover a wide spectrum from disinfection of foods and drinking water, treatment of process water, odor control, zebra mussel eradication, Anthrax destruction, disinfection of medical waste, wastewater treatment, and oil- and injection water well stimulation, paper pulp bleaching, and fabric bleaching.

Chlorine dioxide is not available for purchase or may not be readily available for every application in which it might be used. In certain situations, regulatory and economic limitations suggest that the chloring dioxide cannot be shipped, but instead must be generated on site at the time of use. The need for generation has spawned a variety of processes in which a relatively small group of precursors are combined in different ways. These can be broken down into groups depending on the precursor and the method of conversion.

Two generally indispensable precursors around which many chlorine dioxide generation methods are built are sodium chlorate, $NaClO_3$, and sodium chlorite, $NaClO_2$. Sodium chlorate is the less expensive of the two and, as such, has become the precursor of choice for the paper industry, which uses chlorine dioxide daily in tonnage quantities to bleach and delignify paper pulp, as well as for applications such as wet-end biological control on paper machines. Lowering chemical costs justifies the investment in corrosion resistant, operator-controlled titanium machinery suit to carry-out acidic chlorate conversion. There is a commercially available small-scale, three-chemical method for chlorate conversion U.S. Pat. No. 6,790,427, which is hereby incorporated by reference in its entirety. The method teaches the combination of concentrated sulfuric acid, and a proprietary mix of sodium chlorate and hydrogen peroxide to convert the chlorate to chlorine dioxide.

Other known generation methods employ sodium chlorite, despite its higher cost, because of the relative ease of conversion. Conversion methods can be categorized as one chemical, two chemical, and three chemical, each of which offers a specific advantage. One chemical method includes electrolytic oxidation of chlorite anion, and exposure to ultraviolet light. Current electrolytic methods can generate hundreds of pounds of chlorine dioxide per day, whereas ultraviolet methods are useful in cases where a few pounds per day are adequate.

In view of the shortcomings of the prior art, it would be desirable to have an improved method of generating chlorine dioxide using two precursor chemicals that may result in high conversion rates, be able to be carried-out in situ, when necessary, and be conducted in a scaleable manner, to meet the needs of large users of $ClO_2$, such as paper mills, and small users such as private water treatment facilities.

Further, many acid-chlorite methods are known. Such methods that employ hydrochloric acid are known to yield no greater than a theoretical 80% conversion rate of the chlorite used into chlorine dioxide, with practical yields closer to 70%. Diluted (9-15%, by weight) hydrochloric acid is commonly used as the acid in the generation of chlorine dioxide from chlorite. Concentrated sulfuric acid cannot be combined directly with chlorite, as it reacts too violently and generates a significant amount of heat, which lends to volatilization of produced chlorine dioxide and possible damage to plastic generation equipment.

It would, therefore, be desirable to have a method which employs 'dilute sulfuric acid' in the generation of chlorine dioxide and results in higher conversion efficiencies than were previously known for this chemistry with little or no conversion of generated chlorine dioxide to chlorate even with prolonged residence time in the reactor. This increase in conversion efficiency would result in obvious economic advantages over previously known methods.

SUMMARY OF THE INVENTION

The present invention provides an improved method of generating chlorine dioxide using two precursor chemicals. In an illustrative embodiment of the invention, it has been found that by first diluting the concentrated sulfuric acid with water to 50% acid and then allowing the hot acid solution to cool, the resulting acid may be safely combined directly with sodium chlorite to yield chlorine dioxide in a reaction which is ~80% efficient. This results in a number of unexpected advantages over prior art acid-chlorite systems.

In an illustrative embodiment, the present invention relates to the use of 'dilute sulfuric acid' in the generation of chlorine dioxide, resulting in higher conversion rates than would be expected for this chemistry when used with prior-art methods. Further, generation according to the present invention produces $ClO_2$ with little or no conversion of generated chlorine dioxide to chlorate even with prolonged residence time in the reactor.

DETAILED DISCLOSURE OF THE PREFERRED EMBODIMENTS

The subject invention is directed to novel methods for chlorine dioxide generation. In one embodiment, the present methods may utilize a dilute sulfuric acid solution and a sodium chlorite solution as the sole constituents in the generation process.

Two exemplary chemical chlorite conversion methods include two very different reaction routes with different theoretical conversion efficiencies. One method involves combination of chlorite with an oxidizing agent, most commonly aqueous or molecular chlorine, and the other method uses simple acidification to effect conversion. The former has a theoretical conversion efficiency of 100% (equations 3 and 4), whereas the theoretical efficiency of the latter is 80% (equation 5). In practice, actual efficiencies maximize at 95-98%, and 65-75%, respectively.

$$NaClO + H^+ \rightarrow HClO + Na^+ \qquad (1)$$

$$NaClO_2 + H^+ \rightarrow HClO_2 + Na^+ \qquad (2).$$

$$HClO + 2HClO_2 \rightarrow 2ClO_2 + HCl + H_2O \qquad (3)$$

$$Cl_2 + 2NaClO_2 \rightarrow 2ClO_2 + 2NaCl \qquad (4)$$

$$5NaClO_2 + 4HCl \rightarrow 4ClO_2 + 2H_2O + 5NaCl \qquad (5)$$

Of the many methods for chlorine dioxide generation, preparation by mixing acid and chlorite is widely used because of its simplicity and the long-term chemical stability of the two most commonly used precursors, aqueous sodium chlorite and hydrochloric acid. Typical commercially available technology employs 7.5% sodium chlorite and 9% hydrochloric acid (equation 5). These precursors may be pumped into a reaction chamber in the proper proportions and the mix is allowed to remain in concentrated contact for a period of time long enough to give the relatively slow conversion reaction time to take place before being discharged into the dilution water which carries the chlorine dioxide solution to the point of injection. Pumping rates are adjusted to whatever rate is needed to make the required quantity of chlorine dioxide.

Hydrochloric acid is almost universally used as the acid because chloride ion is believed to be a catalyst for this conversion. The reaction has the disadvantage of producing only four molecules of chlorine dioxide for five reacting chlorite ions (equation 5), but the positive aspects of this method in terms of safety and reliability make it attractive and widely used nonetheless.

While the preceding method has attractive advantages which have given it wide use, there is a fundamental disadvantage which must be considered. The conversion of chlorite to chlorine dioxide first of all occurs with a loss of 20% of the chlorite consumed because of the chemistry involved. This loss is considered acceptable in light of the ease of the method. Properly generated, the conversion efficiency should be 80%; that is every five chlorite ions should generate four chlorine dioxide molecules. This is normally not the case in actual practice. A competitive reaction occurs which reduces the quantity of generated chlorine dioxide.

Acid/chlorite chlorine dioxide generation is not instantaneous, but rather requires the precursors be in concentrated contact for about 1-3 minutes. The reactants are normally retained in the reaction chamber for the period of time necessary to effect this conversion before injection in dilution water. During precursor conversion, at the very high concentration of chlorine dioxide present in the reactor, chlorine dioxide will react with water to form chlorate and reduce the actual yield by whatever amount is lost as chlorate (reference 1)

$$6ClO_2 + 3H_2O \rightarrow 5ClO_3 + HCl \quad (6)$$

The reactor is therefore sized for a specific pumping rate to allow complete conversion with the minimum of loss as chlorate. If pumping rates are below those used for reactor sizing, then precursors and generated chlorine dioxide remain in the reaction zone longer, and more loss of chlorine dioxide to chlorate formation occurs. The reactor volume could then be a compromise between large enough to allow high volume generation, but small enough to limit chlorine dioxide loss at low pumping rates, or if the generator is to be used to produce a constant amount of chlorine dioxide, the reactor will be sized for maximum conversion at the desired rate.

Almost no known commercially available acid/chlorite process uses sulfuric acid as the proton donor. There are several reasons for this lack. First, the chemistry of sulfuric acid conversion is reported to give only 50% conversion of chlorite to chlorine dioxide (equation 7). While chloride is a by-product of this reaction and would be expected to catalyze conversion and change the chemistry to that yielding 80% conversion, the concentration of by-product chloride is apparently insufficient to effect significant catalysis in the brief time the reactants would remain in the reaction chamber before injection into dilution water.

$$4NaClO_2 + 2H_2SO_4 \rightarrow 2ClO_2 + HClO_3 + 2Na_2SO_4 + H_2O + HCl \quad (7)$$

The other reason sulfuric acid is not normally used in chlorite conversion is the difficulty in working with concentrated sulfuric acid, which generates much heat of solution on contact with water and would make the conversion reaction difficult to control and possibly cause thermal damage to the generation equipment. This generated heat is actually used to drive the process in the small three-chemical acid/peroxide/chlorate method referenced above to encourage conversion of the relatively inert chlorate in to chlorine dioxide. The single known European use of sulfuric acid conversion is with the intent of eliminating chloride ion from the final product.

The presently disclosed invention sets forth novel acid/chlorite chemistry using sulfuric acid which has been shown by analysis to produce 75-80% conversion of sodium chlorite to chlorine- and chlorite-free chlorine dioxide.

In the present invention, a solution of 7.5-15% aqueous sodium chlorite is combined with previously diluted and cooled 50% aqueous sulfuric acid and allowed to remain in contact for from about 5 to about 300 seconds, although preferable from about 30 seconds to about 60 seconds before injection into dilution water. Four-step iodometric titration (reference 2) has shown the product to be chlorine- and chlorite ion-free, with the conversion ranging from 75 to 80% of theoretical. Thus, the method produces a higher yield of high quality chlorine dioxide than previously described for sulfuric acid chlorite conversion.

A route by which this conversion could take place is by the chlorite first converting to chlorous acid, and then in the highly concentrated environment, the chlorous acid converts to chlorine dioxide in a manner analogous to that which occurs in the hydrochloric acid/chlorite conversion, where 5 chlorous acids yield 4 chlorine dioxide molecules, with one chlorous acid reverting to chloride (equation 9).

$$2NaClO_2 + H_2SO_4 \rightarrow 2HClO_2 + Na_2SO_4 \quad (8)$$

$$5HClO_2 \rightarrow 4ClO_2 + HCl + 2H_2O \quad (9)$$

Examples are listed in Table 1. The ratio of titration 'B' (titrant volume indicating chlorite ion concentration) to titration 'A' (titrant volume indicating chlorine dioxide concentration) is listed in column 5. Ideal conversion should give a ratio of 4.0 since each chlorine dioxide in step A of the titration produces one chlorite anion, and each produced chlorite anion when acidified in step B reacts with four times the volume of titrant than does chlorine dioxide.

TABLE 1

Results of four step iodometric titrations.

| mL 15% sodium chlorite | ML 47% $H_2SO_4$ | Time (sec) | Ppm $ClO_2$ | Ratio B/A | Efficiency (%) |
|---|---|---|---|---|---|
| 0.5 | 0.25 | 15 | 44 | 4.4 | 68 |
| 0.5 | 0.25 | 30 | 43.5 | 4.8 | 67.5 |
| 0.5 | 0.25 | 60 | 46.5 | 4.3 | 72.2 |
| 0.5 | 0.5 | 15 | 52.5 | 4.3 | 81.5 |
| 0.5 | 0.5 | 30 | 50.0 | 4.03 | 78 |
| 0.5 | 0.5 | 60 | 55 | 3.85 | 85 |
| 0.5 | 0.75 | 15 | 54.3 | 3.8 | 84 |
| 0.5 | 0.75 | 30 | 55 | 3.82 | 85 |
| 0.5 | 0.75 | 60 | 50 | 4.2 | 78 |

The table also shows that low yields are produced if insufficient acid is employed, but once the proper ratio is achieved, the conversion efficiency is relatively insensitive to the presence of excess sulfuric acid, as well as the residence time in the reactor, where prolonged residence time might be expected to lead to chlorine dioxide loss by reaction with water to form chlorate as it does in the hydrochloric acid/chlorite generators. This decay mechanism apparently does not occur in sulfuric acid/chlorite generation chemistry. Samples have been retained in the reactor for up to 15 minutes without significant loss of chlorine dioxide. In one series of experiments, equivalent volumes of 7.5% sodium chlorite and 50% sulfuric acid were reacted for 1, 5, and 15 minutes before dilution. Analysis showed the chlorine dioxide produced in these three experiments to be 37.8, 37.8, and 35.0 ppm, respectively, showing almost no loss when residence time was increased by a factor of 15. This means the reactor used can be fairly large and therefore can accommodate more precursors without product loss, allowing for the scaling up of the generator to higher capacities than typical of chlorite/hydrochloric acid generators.

The use of chlorine dioxide as a disinfectant and oxidant is widely accepted throughout the world. The present invention teaches a method that offers significant performance and economic advantages over known methods to make the generation of chlorine dioxide more practical for a wide range of applications.

One embodiment of the subject invention is directed to the addition of the cooled diluted sulfuric acid to a sodium chlorite solution.

In the preferred embodiment, the combination of the dilute sulfuric acid with the sodium chlorite solution is carried out in a reaction vessel with a discharge opening into a treatment stream so that the reactants are not diluted until the reaction is complete.

What is claimed:

1. A two chemical conversion method for preparing chlorine dioxide, comprising:
    reacting a 7.5-25 weight % aqueous sodium chlorite solution with a 20-50 weight % aqueous sulfuric acid as sole constituents in a reaction chamber sized to allow the aqueous sodium chlorite solution and the aqueous sulfuric acid to react for about 5 seconds to about 300 seconds to form a reaction mixture comprising chlorine dioxide in which 75% or more and 85% or less of chlorite ion in the sodium chlorite solution is converted to chlorine dioxide.

2. The method of claim 1, further comprising:
    diluting a concentrated sulfuric acid with water to 20% to 50% by weight and cooling the diluted aqueous sulfuric acid to remove heat of reaction and using the cooled 20 to 50% by weight aqueous sulfuric acid in the reacting step.

3. The method of claim 1, wherein the aqueous sodium chlorite solution and the aqueous sulfuric acid are contacted for about 30 seconds to about 60 seconds.

4. The method of claim 1, wherein a prolonged time of storage of the reaction mixture prior to diluting the reaction mixture with water does not result in a significant loss of the produced chlorine dioxide by reaction with water to form chlorate.

5. A method for generating chlorine dioxide, comprising:
    introducing an aqueous sodium chlorite solution and an aqueous sulfuric acid separately into a reactor as sole constituents, and
    reacting the aqueous sodium chlorite with the aqueous sulfuric acid to form a reaction mixture by converting 75% or more and 85% or less of chlorite ions to chlorine dioxide,
    wherein the aqueous sodium chlorite solution has a concentration in the range of 7.5-25% by weight, and the aqueous sulfuric acid has a concentration in the range of 20-50% by weight.

6. The method of claim 5, further comprising storing the reaction mixture in the reactor for about 1 to 15 minutes without a significant conversion of the chlorine dioxide to chlorate.

7. The method of claim 5, wherein the reaction mixture is substantially chlorine and chlorite free.

8. The method of claim 5, wherein the reactor has a discharge opening which communicates with a treatment stream, and the reaction mixture is not diluted until the reaction is complete.

9. The method of claim 5, further comprising:
    diluting a concentrated sulfuric acid to 20% to 50% by weight with water and cooling the diluted aqueous sulfuric acid to remove heat of reaction and using the cooled 20 to 50% by weight aqueous sulfuric acid in the reacting step.

10. The method of claim 1, further comprising discharging the reaction mixture from the reactor via a discharge opening of the reactor to a treatment stream.

11. The method of claim 2, wherein the concentrated sulfuric acid is diluted with water to approximately 50% by weight and cooled.

12. The method of claim 1, wherein the aqueous sulfuric acid has a concentration of approximately 50% by weight.

13. The method of claim 1, wherein the percent conversion of chlorite ion to chlorine dioxide is determined by four step iodometric titration.

14. A method for preparing chlorine dioxide, comprising:
    reacting a 7.5-25 weight % aqueous sodium chlorite solution with a 20-50 weight % aqueous sulfuric acid solution as sole constituents in a reactor for 5 to 300 seconds to obtain a reaction mixture in which 81.5% or more and 85% or less of chlorite ion in the aqueous sodium chlorite solution is converted to chlorine dioxide.

15. The method of claim 14, further comprising:
    diluting a concentrated sulfuric acid to approximately 50% by weight aqueous sulfuric acid solution and cooling the aqueous sulfuric acid solution and using the resulting cooled, diluted sulfuric acid in the reacting step.

16. The method of claim 14, further comprising storing the reaction mixture in the reactor for about 1 to 15 minutes without a significant conversion of the chlorine dioxide to chlorate.

17. The method of claim 14, further comprising discharging the reaction mixture to a treatment stream via a discharge opening of the reactor.

18. The method of claim 14, wherein at least 84% of the chlorite ion is converted to the chlorine dioxide in the reaction mixture.

19. The method of claim 15, further comprising discharging the reaction mixture from the reactor via a discharge opening of the reactor to a treatment stream.

* * * * *